US008307176B1

(12) United States Patent
Wu et al.

(10) Patent No.: US 8,307,176 B1
(45) Date of Patent: *Nov. 6, 2012

(54) METHOD AND SYSTEM FOR EFFICIENT SPACE MANAGEMENT FOR SINGLE-INSTANCE-STORAGE VOLUMES

(75) Inventors: Weibao Wu, Vadnais, MN (US); Xianbo Zhang, Madison, WI (US)

(73) Assignee: Symantec Operating Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/274,834

(22) Filed: Oct. 17, 2011

Related U.S. Application Data

(63) Continuation of application No. 12/165,469, filed on Jun. 30, 2008, now Pat. No. 8,041,907.

(51) Int. Cl.
*G06F 12/00* (2006.01)
*G06F 7/00* (2006.01)

(52) U.S. Cl. ............ 711/161; 711/4; 711/100; 707/640; 707/661; 707/736

(58) Field of Classification Search .................. 711/4–5, 711/100, 111–112, 114–115, 161–162, 165; 707/205, 661–663, 736–737; 365/230.01–230.02
See application file for complete search history.

(56) References Cited

U.S. PATENT DOCUMENTS

| 5,933,840 | A  | * | 8/1999  | Menon et al. ........................... 1/1 |
| 6,785,786 | B1 | * | 8/2004  | Gold et al. ..................... 711/162 |
| 7,277,899 | B1 | * | 10/2007 | Salyzyn ................................ 1/1 |

* cited by examiner

*Primary Examiner* — Tuan Thai
*Assistant Examiner* — Zhuo Li
(74) *Attorney, Agent, or Firm* — Campbell Stephenson LLP (57) ABSTRACT

A method and system for efficient space management for single-instance-storage volumes is provided. A backup module storing data within a collection of containers according to access locality and retention time of the data, wherein the retention time defines an amount of time the data is stored within the collection of containers before deletion of the data, and the access locality comprises an order in which the data is to be accessed is further provided. A compaction module compacting the stored data by selecting at least two containers among the collection of containers, wherein the selection is performed using a predetermined criteria that includes access locality and retention time of the data is also provided. The compaction module distributes the data among the at least two containers. The compaction criteria creates an imbalance among the containers to create more empty, full, or nearly full containers.

20 Claims, 11 Drawing Sheets

File 1 FP = [S1, S2, S5]

File 2 FP = [S2, S3, S4]

METHOD AND SYSTEM FOR EFFICIENT SPACE MANAGEMENT FOR SINGLE-INSTANCE-STORAGE VOLUMES

CROSS-REFERENCE TO RELATED APPLICATIONS

The present patent application is a continuation of U.S. patent application Ser. No. 12/165,469, (now U.S. Pat. No. 8,041,907), filed on Jun. 30, 2008, entitled "Method and System for Efficient Space Management for Single-Instance-Storage Volumes" and is incorporated by reference herein in its entirety and for all purposes as if completely and fully set forth herein.

BACKGROUND OF THE INVENTION

1. Field of the Invention

The present invention relates in general to the field of data processing systems, and more particularly, the present invention relates to managing data in a networked data processing system environment incorporating a single-instance-storage volume.

2. Description of the Related Art

An ever-increasing reliance on information and computing systems that produce, process, distribute, and maintain such information in its various forms, continues to put great demands on techniques for providing data storage and access to that storage. Business organizations can produce and retain large amounts of data. While data growth is not new, the pace of data growth has become more rapid, the location of data more dispersed, and linkages between data sets more complex.

Generally, a data deduplication system provides a mechanism for storing a piece of information only one time. Thus, in a backup scenario, if a piece of information is stored in multiple locations within an enterprise, that piece of information will only be stored one time in a deduplicated backup storage volume. Similarly, if the piece of information does not change during a subsequent backup, that piece of information will not be duplicated in storage as long as that piece of information continues to be stored in the deduplicated backup storage volume. Data deduplication can also be employed outside of the backup context thereby reducing the amount of active storage occupied by duplicate files.

The storage area of a data deduplication system is called a single-instance-storage volume. When used in a backup context, single-instance-storage volumes may store multiple backups that are made at different times. Because of the general nature of a data deduplication system of storing only one instance of data at a time, the multiple backups necessarily include both data altered since an immediately previous backup and pointers to data that has not been altered since the most recent backup. Upon receipt of a restore request, a backup module may access many physical areas of the single-instance-storage volume as dictated by the pointers to retrieve the necessary data to fulfill the restore request.

Those with skill in the art will appreciate that backups are typically saved for a limited time and are then deleted from the single-instance-storage volume to free space for future backups. The deletion of backups creates "gaps" in the single-instance-storage data store, which increases the time and resources to access data in order to fulfill restore requests. Thus, there is a need for handling the access of backup data in a single-instance-storage volume as multiple backups and deletions of old backups create an increasingly fragmented volume.

SUMMARY OF THE INVENTION

The present invention includes a method and system for efficient space management for single-instance-storage volumes. A backup module stores data within a collection of containers according to access locality and retention time of the data, wherein the retention time defines an amount of time the data is stored within the collection of containers before deletion of the data, and the access locality comprises an order in which the data is to be accessed. A compaction module compacts the stored data by selecting at least two containers among the collection of containers, wherein the selection is performed using a predetermined criteria that includes access locality and retention time of the data. The compaction module distributes the data among the at least two containers. Over time, the retention time will be reached for some of the data segments, which create gaps or wasted space in the containers. To reuse the space, data compaction is needed. The compaction module distributes the data among at least two containers. The compaction process removes gaps and creates imbalance among the containers by creating empty, full, or nearly full containers.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A general concept behind data deduplication is to reduce an amount of storage needed for enterprise data by eliminating duplicated data content. One embodiment of a deduplicated data storage area is called a single-instance-storage (SIS) volume. In an SIS volume, only a single instance of a piece of data is stored. A common use of single-instance-storage volumes is in maintaining data backups for servers and other computing equipment in an enterprise network. For each backup, only a single instance of information duplicated in the enterprise network will be stored in the single-instance-storage volume. In addition, for subsequent backups occurring over time, data that has not changed from one backup to another need not be stored in the subsequent backup. In this manner, significant savings in data storage space can be realized.

As an example of data deduplication in a backup environment, an initial full backup of a file server can be performed in which the data included in the backup is divided and identified. Subsequent daily backups of the file system involve identifying new or changed segments of data using the same data identification system as performed with the full backup and then storing only the new or changed data in the single instance storage volume. Depending upon the number of new or changed files in the file system, a reduction of size of the backup subsequent to the initial full backup can be as much as 99%. The single instance store approach to backup allows for very small daily backups with an ability to recover a full image from any backup on any day. Furthermore, the distinction between a "full" backup and an "incremental" backup disappears. All backed up data can be restored at any time using a single backup restore.

Figure 1A:
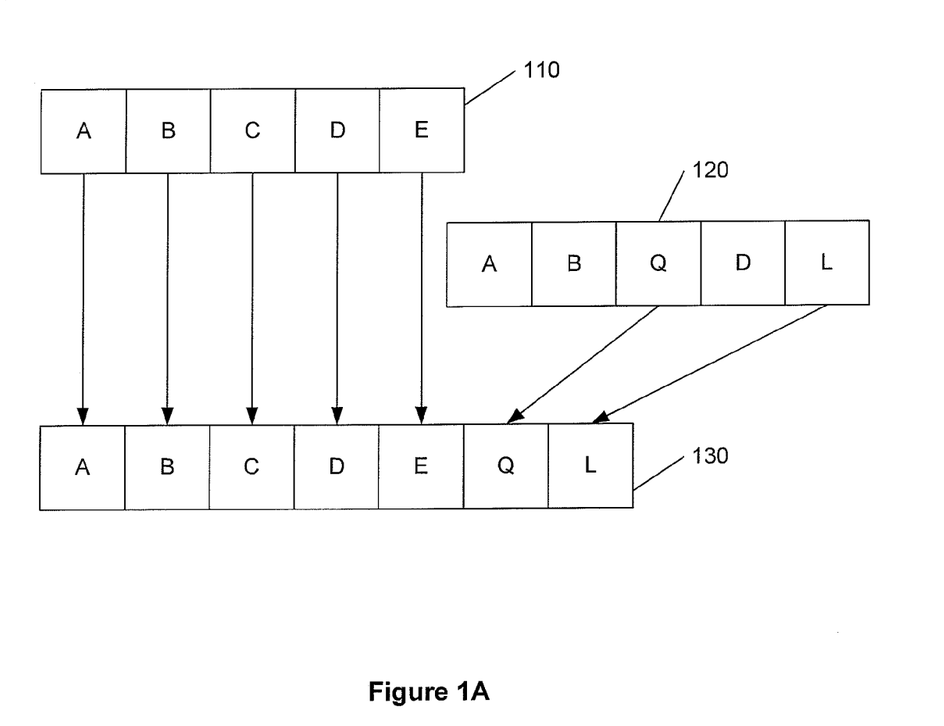
FIG. 1A is a simplified block diagram illustrating an example method of data deduplication according to an embodiment of the present invention.

FIG. 1A is a simplified block diagram illustrating an example method of data deduplication in accordance with an embodiment of the present invention. Files 110 and 120 share identical content, but the files themselves are not completely identical. Each file is broken into equal sized segments: A, B, C, D, E, F for file 110 and A, B, Q, D, L for file 120. The data deduplication system will write file segments A, B, C, D, E, Q, and L into the single instance storage volume (130). The data deduplication system will not write file segments A, B, and D from file 120 into the single instance storage volume. In general, if two data segments are the same, one can save space in a single instance storage volume by only backing up one copy of the segment and providing two pointers to that segment. In order to track a location of data for a file, metadata containing, for example, pointers to the data of a file will also be stored in a metadata storage area.

Figure 1B:
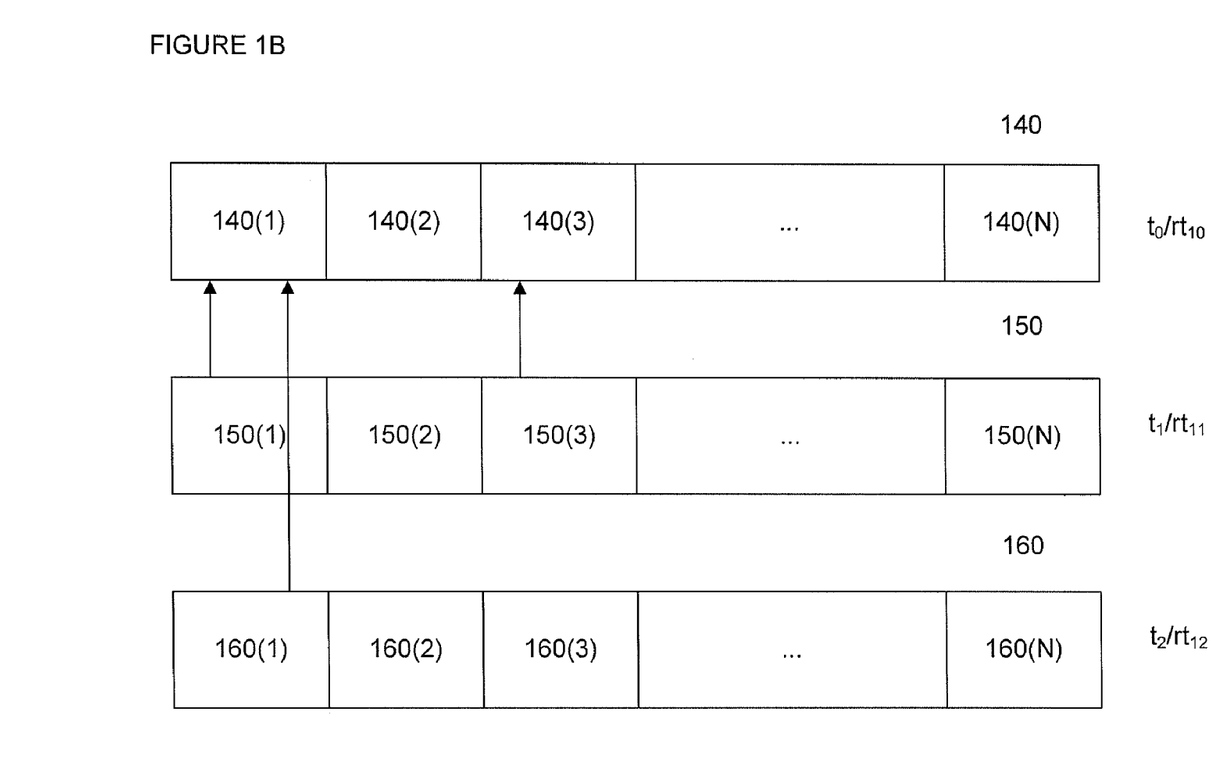
FIG. 1B is a simplified block diagram depicting an example method of freeing up storage space within a single instance storage volume according to an embodiment of the present invention.

FIG. 1B is a simplified block diagram illustrating an example method of freeing up storage space within a single-instance-storage volume according to data retention times, in accordance with embodiments of the present invention. Those with skill in the art will appreciate that embodiments of the present invention may also free up storage space within a single-instance-storage volume according to system administrator and/or user commands. Those with skill in the art will appreciate that backup files usually have an associated retention time that indicates when the particular backup file will be deleted or retired (e.g., archived to tape) to free up storage space in the single-instance-storage volume. Files 140, 150, and 160 represent backups of a file system that were created at times $t_0$, $t_1$, and $t_2$, respectively and have data retention times of $rt_{10}$, $rt_{11}$, and $rt_{12}$, respectively. Retention time is the period in which data will be retained in the storage volume. Once the retention time expires, the associated data is deleted from the storage volume or retired (e.g., archived to tape). As indicated by arrows within FIG. 1B, segments 150(1) and 160(1) are dependent on segment 140(1) and segment 150(3) is dependent on segment 140(3). According to an embodiment of the invention, one reason for the dependencies is that the data stored in segment 140(1) remains unchanged at the times of the backups that resulted in files 150 and 160. Since the single instance storage volume only stores a single instance of a piece of data, instead of storing duplicate data segments 150(1) and 160(1), pointers that reference segment 140(1) are placed in those locations instead. A similar relationship applies for segments 140(3) and 150(3).

After the expiration of retention time $rt_{10}$, all segments within file 140 that do not have dependencies (e.g., segments 140(2) and 140(N)) are deleted or retired. Similarly, after expiration of retention time $rt_{11}$, segments 150(2), 150(3) and 150(N) may be deleted or retired. And after expiration of retention time $rt_{12}$, segments 160(2), 160(3), and 160(N) may be deleted or retired. The result is inefficient use of the storage area within the single instance storage volume due to gaps created in the single-instance-storage volume. Data cannot be written or read from contiguous data blocks within single instance storage area. The present invention provides a method and system for efficient use of a single-instance-storage volume by storing, compacting, and reallocating data segments based on access locality and retention time, as discussed herein in more detail.

According to an embodiment of the present invention, a single-instance-storage volume is coupled to and managed by a deduplication server. The deduplication server initially divides the single-instance-storage volume into a collection of containers corresponding to contiguous physical storage areas in the single-instance-storage volume. In one embodiment of the present invention, each container within the collection of containers is a fixed size. When the deduplication server receives a backup data stream (e.g., from a backup server or a client being backed up), the deduplication server selects a container into which to record the backup stream. The selected container acts like a virtual sequential backup device that records a backup stream. The sequential writing of the backup data stream aids in speed of access of backup data for restore operations because the data can be "streamed" back out in a sequential fashion from the contiguous physical storage area. Also, the sequential writing of the backup stream retains access locality of the original data being backed up, since typically backups traverse a directory tree in a consistent (e.g., file-by-file) manner.

A container-based configuration of the single-instance-storage volume also allows for efficient management of multiple backup data streams. For example, if the deduplication server receives more than one backup data stream (e.g., from a plurality of clients being backed up), the deduplication server can allocate a container corresponding to each backup stream until there are no more available containers. When there are no more containers remaining, the deduplication server can allocate two or more streams to a single container, depending on the retention time of the backup streams. Each backup stream has an associated retention time, as set, for example, by a backup server, which represents an amount of time the backup is saved in the single-instance-storage volume before being deleted or retired.

Once a retention time arises, data associated with the retention time can be retired or deleted. But if a data segment has a dependent data segment from a later expiring backup, that segment cannot be removed from the single-instance-storage volume upon expiration of the retention time. A result of keeping segments having dependencies and removing those that do not is gaps in the containers. As retention times for dependent segments expire, additional gaps can result in the older containers. In addition, as gaps occur in the containers, access locality, and its consequent streaming advantages, also dissipates.

As containers are filled and as gaps are created, contiguous free space in the single-instance-storage volume is reduced. This makes it difficult to allocate sufficient free space for future data storage (e.g., backup needs). To provide as much contiguous free space (to improve access locality for future backup streams), an embodiment of the present invention enables remaining segments to be reallocated to containers having approximately a same retention time and access locality as those segments being retained and having enough space to completely accommodate those segments. According to another embodiment of the present invention, remaining segments are allocated to containers having approximately a same retention time as those segments being retained and having just enough space to completely accommodate those segments. Access locality is a probability of a group of data segments to be accessed together, including, but not limited to, an order in which data is to be accessed.

Figure 2:
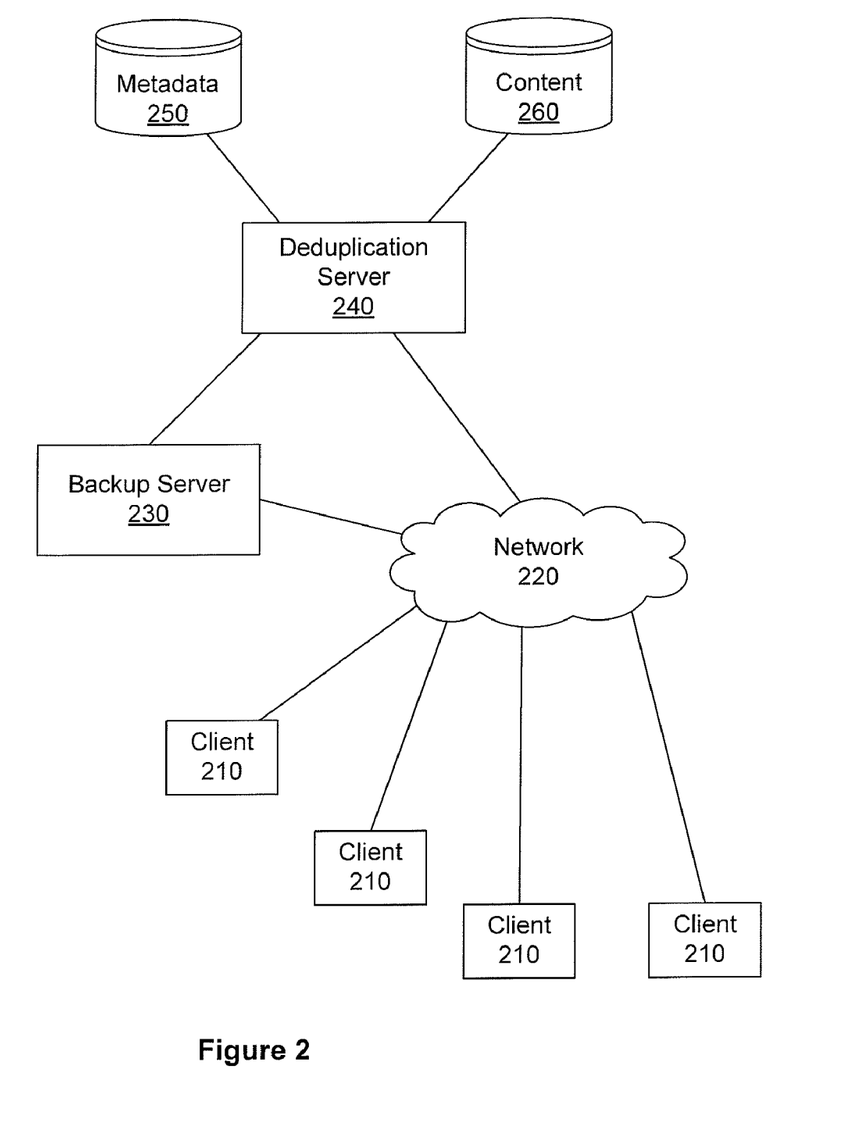
FIG. 2 is a simplified block diagram illustrating an example network incorporating a deduplication system in which an embodiment of the present invention may be implemented.

FIG. 2 is a simplified block diagram of a network incorporating a deduplication system usable with embodiments of the present invention. Client computers 210 are coupled to a network 220. Each client computer has access to one or more file systems that are stored in either storage volumes directly coupled to each of the clients or by storage volumes that are served to the client computers by a storage area network (SAN), network attached storage (NAS), storage appliance and the like (not shown). Client computers can include, for example, servers and desktop nodes. Embodiments of network 220 can include, for example, a local area network, metro area network, wide area network, or any combination thereof.

Backup server 230 is also coupled to network 220. Backup server 230 is configured to, for example, manage administrative tasks related to backing up clients 210. Such tasks include communicating with clients 210 to initiate backup tasks on the clients, maintaining databases related to files and other information backed up from file systems associated with the clients, and managing or tracking resources storing backups of clients 210. In the system illustrated in FIG. 2, backup server 230 is further configured to communicate with deduplication server 240 for purposes of storing backups of client 210 in resources controlled by deduplication server 240. Such communication can be via network 220 or via a direct link between the backup server and the deduplication server.

Deduplication server 240 is coupled to network 220 and performs a variety of tasks related to management and implementation of deduplication services for the system illustrated in FIG. 2. Deduplication server 240 can include one or more physical servers configured to perform a variety of tasks related to deduplication. Deduplication server 240 is in turn coupled to a storage pool for deduplicated data that includes one or more metadata volumes 250 and one or more content volumes 260.

Figure 3:
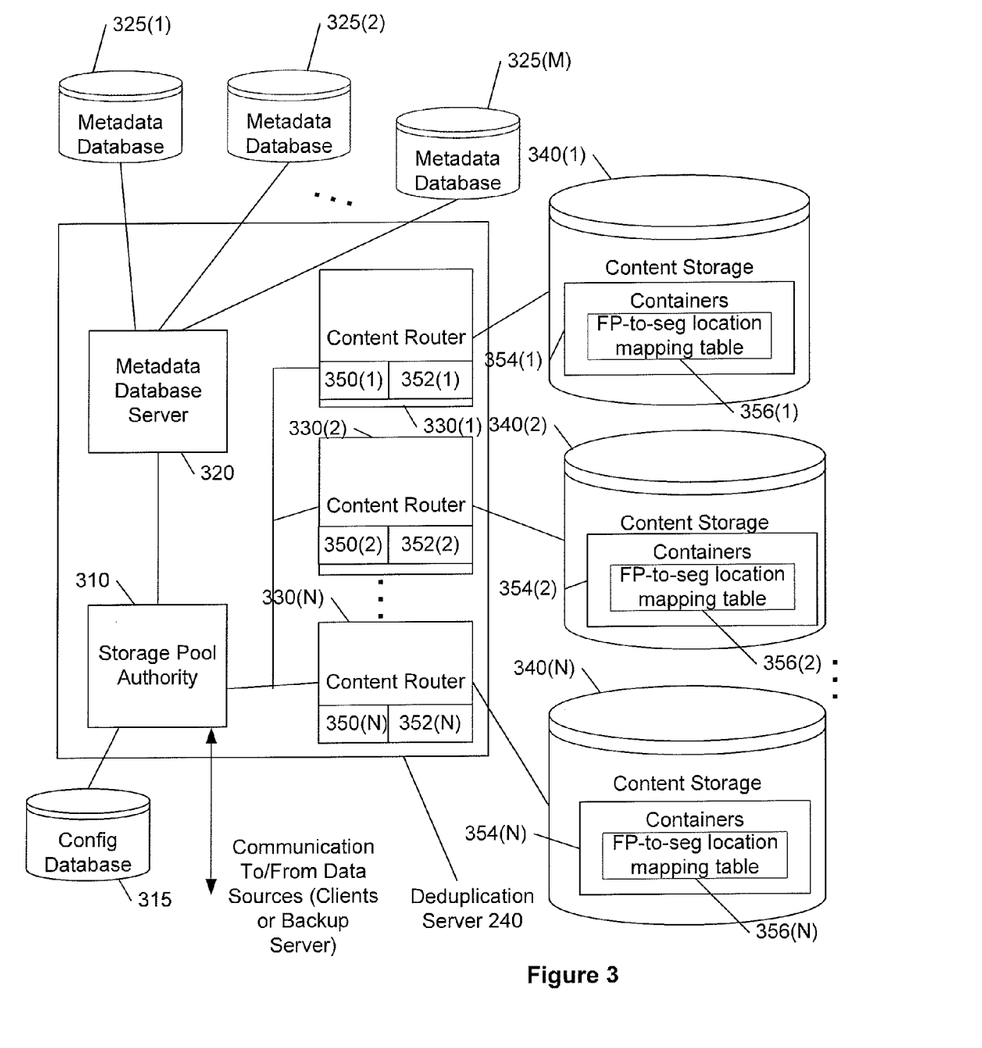
FIG. 3 is a simplified block diagram depicting components of a deduplication server as shown in FIG. 2.

FIG. 3 is a simplified block diagram illustrating components of deduplication server 240. Storage pool authority module 310 performs administration tasks related to management of the storage pool resources. Among such administrative tasks include setting policies for storage resources, such as retention times for data stored, types of metadata associated with stored data that is required, size of data segments, and the like. Storage pool authority module 310 can also perform scheduling-related tasks, management of concurrently arriving data streams, and management of data being provided to content storage (e.g., locations for storing various incoming data). Storage pool authority module 310 can store configuration information for the storage pool in a configuration database 315.

Deduplication server 240 also includes one or more content routers 330(1)-(N) that are communicatively coupled to storage pool authority module 310. The content routers are configured to receive data content being stored in the storage pool managed by deduplication server 240 and to manage the storage of that data in one or more content storage volumes 340. Storage pool authority module 310 can be configured to distribute data in a fair and efficient manner across all content routers 330(1)-(N).

Content routers 330(1)-(N) include corresponding backup modules 350(1)-(N) and compaction modules 352(1)-(N) that can monitor and execute backup and compaction requests received from storage pool authority module 310, respectively. Content storage volumes 340(1)-(N) are further configured to include a collection of containers 354(1)-(N). The containers store data segments in the manner dictated by backup module 350(1)-(N) and compaction module 352(1)-(N). The containers also store a list of segment signatures of each file. For example, according to an embodiment of the present invention, if a file comprises five data segments, and the data segments have the fingerprint signatures FP1-FP5, all of the segment data is stored within one of the collection of containers 354(1)-(N). Fingerprint signatures FP1-FP5 are a hash or checksum of the data segment content. All of the data segments may not be in the same container and may not even be stored in a contiguous fashion. The fingerprint signatures FP1-FP5 are concatenated together to form a data content and a hash of the concatenated content becomes the fingerprint signature of the file (FP6=Hash (FP1-FP5)). The concatenation of these five fingerprint signatures is also treated like a segment and stored in a container 354(1)-(N).

Containers 354(1)-(N) also store a fingerprint (FP)-to-segment location mapping table 356(1)-(N), which maps the fingerprint signatures to the storage locations of the data segments within containers 354(1)-(N). Returning to the earlier example, the FP-to-segment location mapping table includes FP-to-segment location pairs [FP1, loc1], [FP2, loc2], . . . [FP5, loc5], and [FP6, loc6], where loc1-5 is the location of the data segments within the containers. FP6 is the fingerprint signature of the file that comprises data segments 1-5. FP6 is also cataloged in metadata database 325(1)-(N) as part of the metadata of the file. During operation of an embodiment of the present invention, content routers 330(1)-(N) load a copy of an associated FP-to-segment location mapping table 356(1)-(N) into random-access memory to facilitate access times to the FP-to-segment location mapping table 356(1)-(N).

It should be recognized that modules 310, 320, 330, 340, and 350 can be executed by one or more physical servers (which may be implemented by example data processing system 600 illustrated in FIG. 6) configured to perform the functionality required by the various modules.

Figure 4A:
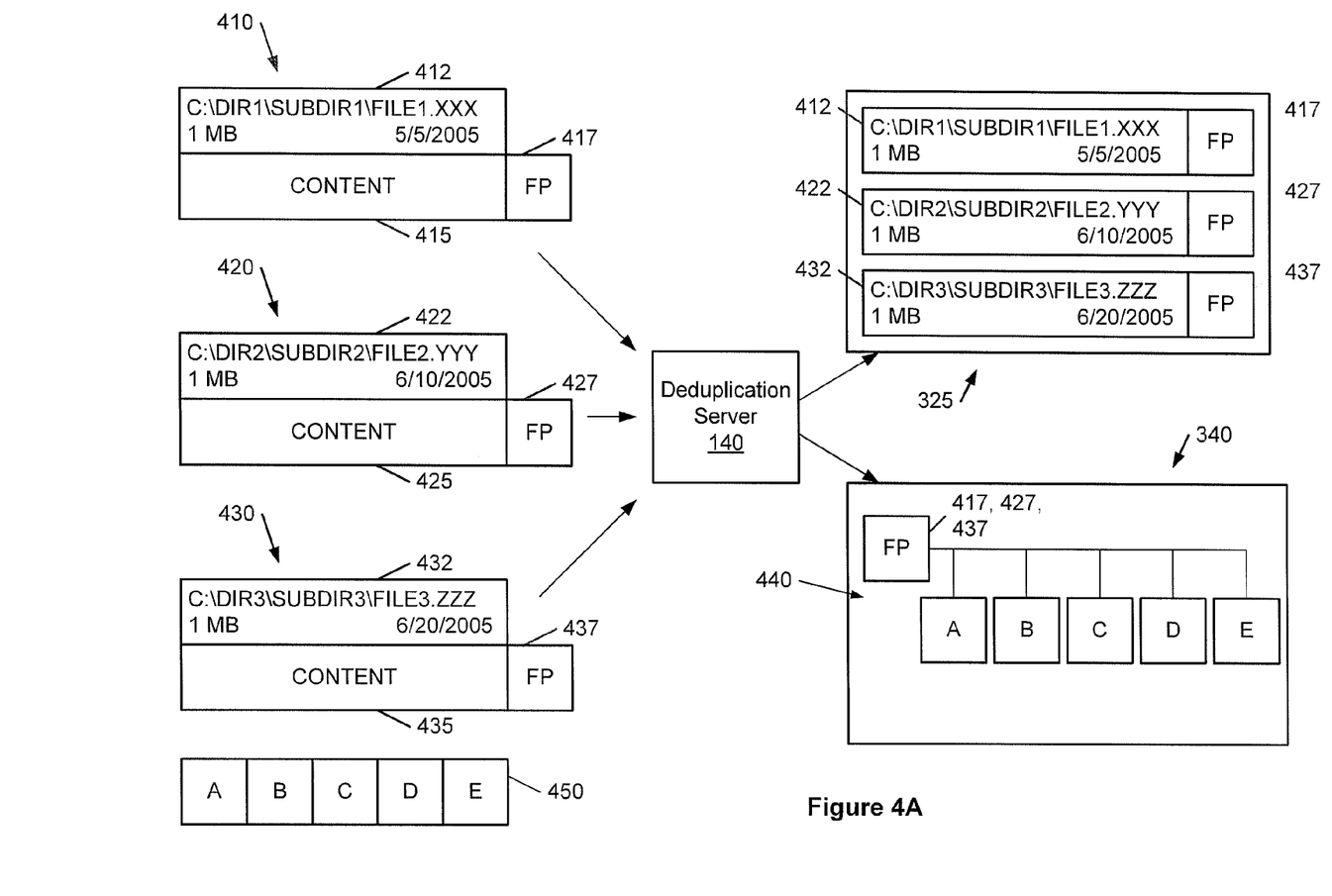
FIG. 4A is a simplified block diagram illustrating information stored in a metadata database engine and the content routers of a deduplication server in accordance with an embodiment of the present invention.

FIG. 4A is a simplified block diagram illustrating an example of information stored by the metadata database engines and the content routers of a deduplication system capable of implementing embodiments of the present invention. FIG. 4A illustrates client files 410, 420 and 430, each of which contains identical content. Files 410, 420 and 430 can be located on the same client or on different clients. Each file is associated with metadata that describes the file (412, 422, 432), including, for example, the filename, size of the file, and a modification date. Each file also contains data content associated with the file (415, 425, and 435). Identity of the content of the files is established by a fingerprint generated using the content of each file (417, 427, 437). The fingerprint of the file content is generated, for example, using a hash or checksum process sufficient to uniquely identify the file content (e.g., a hash of a concatenation of fingerprints of individual data segments that make up the file, such as A-E in 450).

A deduplication process can proceed in the following manner. If, for example, file 410, 420 and 430 are being backed up, file 410 is provided to deduplication server 240. Metadata 412 associated with file 410 is provided to a metadata database engine 325 along with the associated file fingerprint 417. Content 415 of file 410 is divided into a set of segments A, B, C, D and E (450) and these segments are provided to a content router 330 for storage in a content storage volume 340 along with the associated fingerprint 417 as a storage object 440. Thus, the unique fingerprint 417 serves as a link between the information stored in the metadata database and the file content file stored in the content storage volume. As discussed above, not only is the file fingerprint 417 stored with the segments in content storage volume 340, but also fingerprints generated for each data segment.

When file 420 is provided to deduplication server 240, metadata 422 is provided to the metadata database 325 along with fingerprint 427. Deduplication server 140 then checks to see if data associated with fingerprint 427 has already been stored in content storage volume 340. Since storage object 440 has already been provided to content storage volume 340, that data is not duplicated in the content storage volume. A similar process occurs for file 430 in which metadata 432 and the associated file fingerprint 437 are stored in the metadata database but no duplication of data is made in content storage volume 340.

Figure 4B:
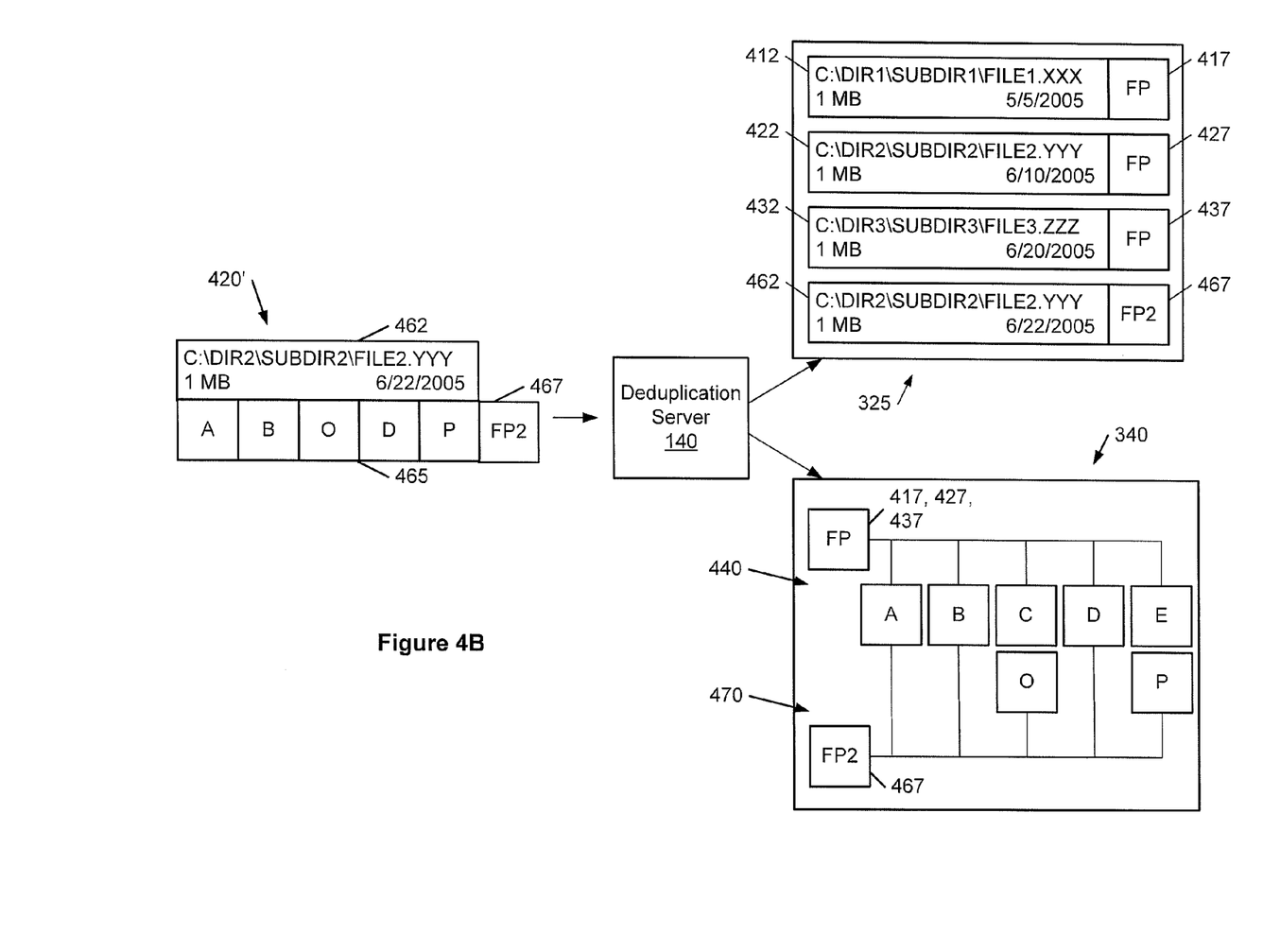
FIG. 4B is a simplified block diagram depicting information stored in an event of a change in one of the files illustrated in FIG. 4A, in accord with an embodiment of the present invention.

FIG. 4B is a simplified block diagram illustrating information stored in the event of a change of one of the files illustrated in FIG. 4A. FIG. 4B illustrates a change occurring in file 420 creating a file 420'. Metadata 462 associated with file 420' reflects a new modification date. Content 465 is illustrated showing that original segments C and E of file 420 have been changed to segments O and P, while the other segments remain the same. Since content 465 is different from original content 425, a different fingerprint 467 is generated.

When file 420' is provided to deduplication server 140, file metadata 462 is provided to metadata database 325 along with new fingerprint file 467. Upon establishing that a storage object associated with file fingerprint 467 has not been previously stored in content storage volume 340, file content 465 is provided to a content router associated with content storage volume 340. The content router can establish that of all the segments comprising file content 465, only segments O and P have yet to be stored in the content storage volume and file fingerprint 467 is associated with the shared previously stored segments and the modified segment. One example of how a content router can determine whether a data segment has been previously stored is by maintaining a fingerprint (e.g., checksums) of each stored data segment and comparing a fingerprint of a data segment to be stored against those already stored. That association of file fingerprint 467 and the previously stored and modified segments is stored as a storage object 470.

Figure 5:
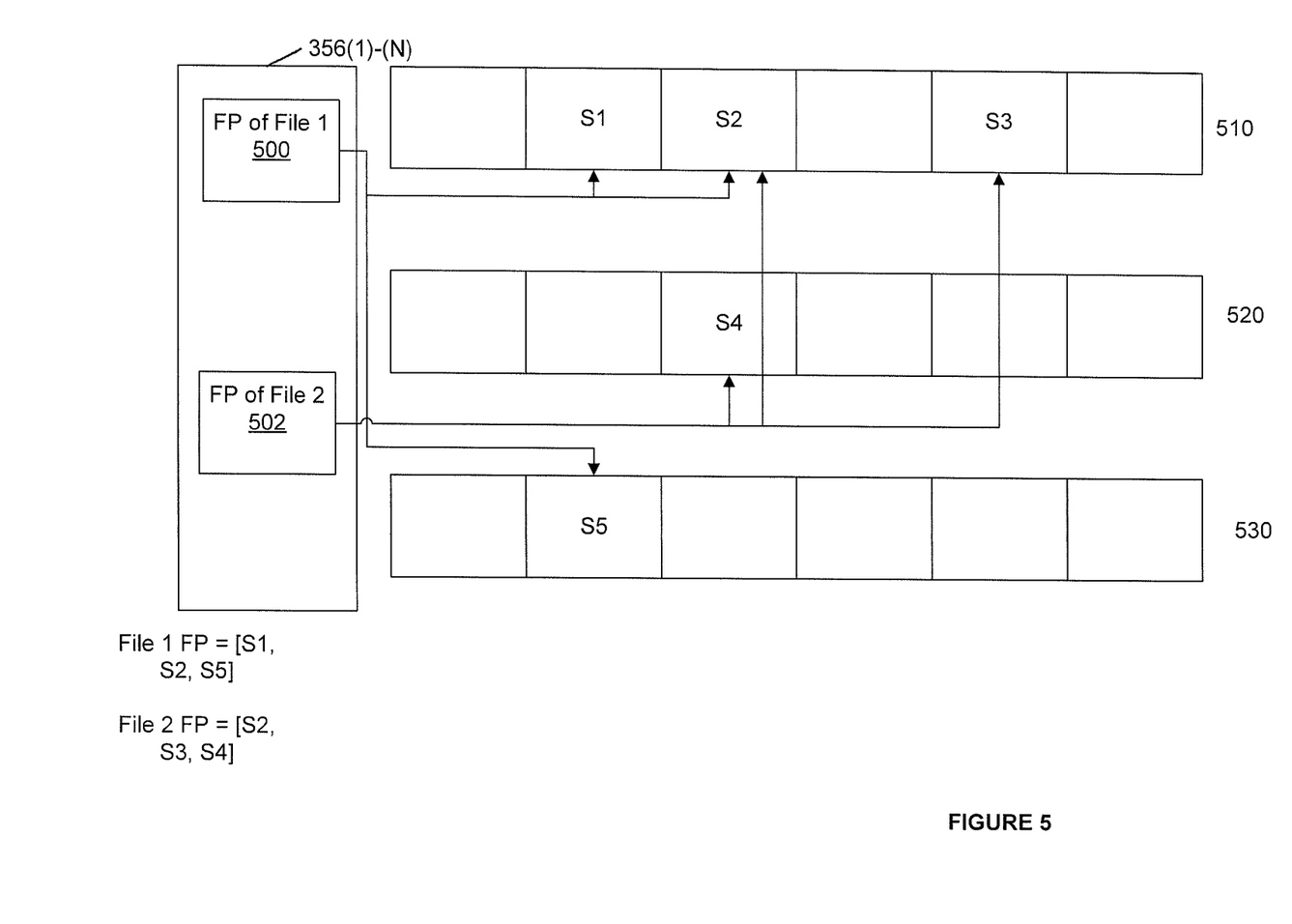
FIG. 5 is a simplified block diagram depicting a relationship between a file fingerprint signature and data segments stored in a collection of containers according to an embodiment of the present invention.

FIG. 5 is a simplified block diagram illustrating the relationship between FP-to-segment location mapping table 356 and containers 354 according to an embodiment of the present invention. As depicted, FP-to-segment location mapping table 356 includes file fingerprints 500 and 502. As previously discussed, file fingerprint signatures is a hash of the fingerprints of data segments that comprise the files. FP-to-segment location mapping table 356 maps the file and data segment fingerprint signatures to the storage location of the data segments. For example, File 1 comprises data segments S1, S2, and S5. File 2 comprises data segments S2, S3, and S4. According to an embodiment of the present invention, there is a one-to-one correspondence between FP-to-segment mapping tables 356(1)-(N) to each content storage volume 340(1)-(N). In other embodiments of the present invention, there is a master FP-to-segment mapping table that keeps track of all the data stored on the containers in all of the content storage volumes.

According to an embodiment of the present invention, if a user desires to access and/or restore data stored on deduplication server 240, the user browses metadata server 320 to choose a file to access and/or restore. Metadata database 325(1)-(N) stores the file fingerprint signature of the file and the list of data segment fingerprint signatures are retrieved from among the containers 354(1)-(N). For each data segment fingerprint signature, the FP-to-segment location mapping table 356(1)-(N) is referenced to find the location of each data segment within containers 354(1)-(N).

According to an embodiment of the present invention, a compaction a module 352(1)-(N) receives a command (either by content router 330(1)-(N), storage pool authority module 310, or some external request) to initiate compaction of data segments within containers. One compaction criteria that may be utilized by an embodiment of the present invention is to initiate compaction of the data segments when free, unallocated space within containers 354(1)-(N) falls below a predetermined threshold. In general, embodiments of the present invention desires to delay compaction in order to have more deleted or "free" space within the containers 354(1)-(N). The more deleted or "free" space in a source container, the less data needs to be moved by compaction module 352(1)-(N). Embodiments of the present invention provides a system and method for moving small number of valid data segments (where the retention time has not expired and/or includes reference to the data segment from other data segments) to a different container in order to empty containers.

One embodiment of the present invention favors keeping containers either (1) filled to capacity (or as close to capacity as possible) or (2) empty to preserve access locality of newly-stored backup streams. Filling a container with data segments having approximately the same retention time promotes the availability of empty containers since the data segments with approximately the same retention time would be deleted or retired at approximately the same time.

As effect of the compaction/reallocation operation is to free up a container (e.g., 410) for use by future backup operation. This maintains access locality of the future backup by providing contiguous free space in which to store that backup. In addition, by maintaining the compacted data in a group and moving that group to contiguous free space in another container, storing data having similar retention time is a simplification of management of data retention in the single-instance-storage volume.

Figure 6A:
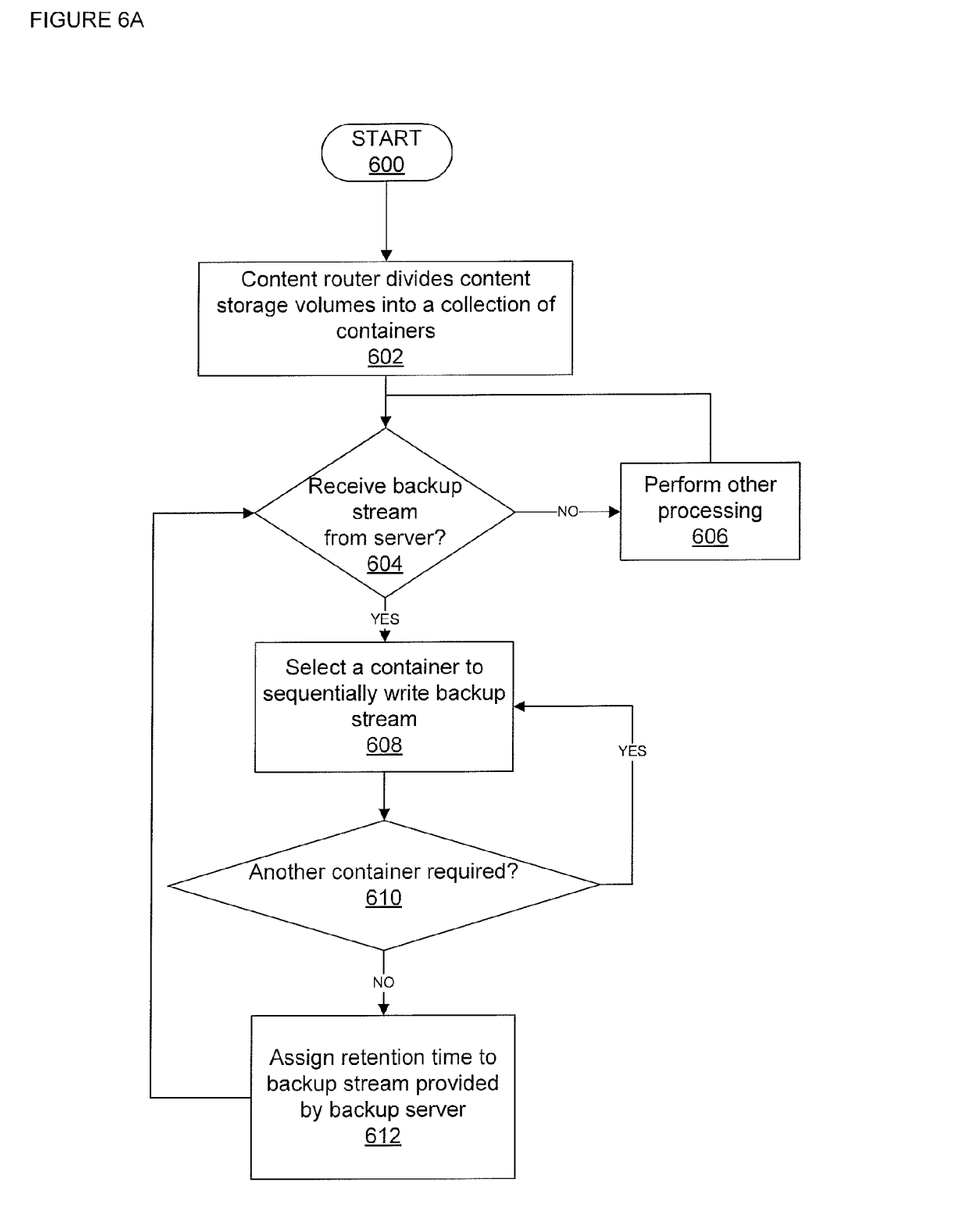
FIG. 6A illustrates an example method for implementing a backup procedure according to an embodiment of the present invention.

FIG. 6A is a flowchart diagram illustrating a method for implementing a backup procedure according to an embodiment of the present invention. The process begins (600), and content routers divide associated content storage volumes into a collection of containers (602). Then, each content router determines if a backup stream has been received from a server (e.g., backup server 230). If not, the content routers perform other processing (606). If a backup stream has been received, the content router instructs an associated backup module to select a container to sequentially write the backup stream (608) and writing commences. If another container is required, the backup module 350(1)-(N) selects another container out of the collection of containers. If another container is not required (e.g., writing the backup store to the content storage volumes is complete), the backup module assigns a retention time to the backup stream as provided by backup server 230.

Figure 6B:
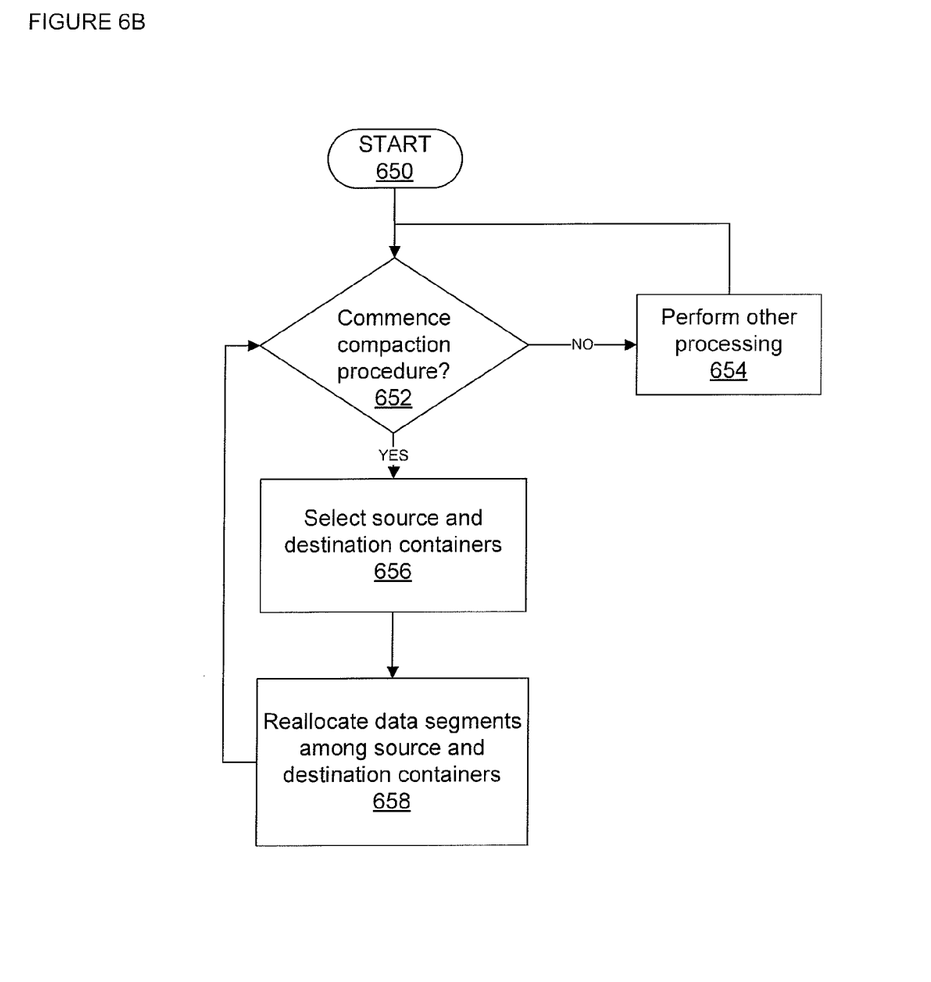
FIG. 6B depicts an example method for implementing a compaction procedure according to an embodiment of the present invention.

FIG. 6B is a flowchart diagram depicting an example method for implementing a compaction procedure according to an embodiment of the present invention. The process begins (650) and a content router determines if a compaction procedure should be commenced. According to embodiments of the present invention, a compaction procedure is initiated by various different ways including, but not limited to, external instructions from a backup server, a client, storage pool authority module 310, if the amount of unallocated free space in a containers falls below a predetermined threshold, or any other method.

If a compaction procedure is to be initiated, the compaction module selects source and destination containers (656). According to an embodiment of the present invention, compaction module takes into account access locality and retention times of the data segments to be reallocated when selecting the source and destination containers.

Access locality is initially preserved when the backup stream is sequentially written to a container. Over time, when retention times expire and/or files are deleted, access locality of the backup stream degrades as data segments are removed from the containers, leaving "gaps" or unallocated storage within the container. A compaction module examines other containers in the collection of containers in the associated content storage volume to determine if there is another container with (1) the same or approximate retention time; (2) if that container has enough free space to accommodate the data segments; and (3) if that container stores data segments with similar access locality as the data segments to be reallocated. One embodiment of the present invention favors keeping containers either (1) filled to capacity (or as close to capacity as possible) or (2) empty. Having at least one empty container preserves access locality of new backup streams since they would be sequentially written to a single empty container. Filling a container with data segments having approximately the same retention time also would promote the availability of completely-empty containers since the data segments with approximately the same retention times would be deleted or retired (e.g., archived to tape) at approximately the same time.

After the compaction module selects the source and destination containers, the compaction module reallocates data segments among the source and destination containers (658). According to an embodiment of the present invention, after the reallocation of data between the source and destination containers, the content router updates the appropriate FP-to-segment location mapping tables to reflect the changes introduced by the compaction operation.

As discussed, the present invention includes a method and system for efficient space management for single-instance-storage volumes. A backup module stores data within a collection of containers according to access locality and retention time of the data, wherein the retention time defines an amount of time the data is stored within the collection of containers before deletion of the data, and the access locality comprises an order in which the data is to be accessed. A compaction module compacts the stored data by selecting at least two containers among the collection of containers, wherein the selection is performed using a predetermined criteria that includes access locality and retention time of the data. The compaction module distributes the data among the at least two containers. The compaction criteria create an imbalance among the containers to create more empty, full, or nearly full containers.

An Example Computing And Network Environment

As shown above, the present invention can be implemented using a variety of computer systems and networks. An example of one such computing and network environment is described below with reference to FIGS. 7 and 8.

Figure 7:
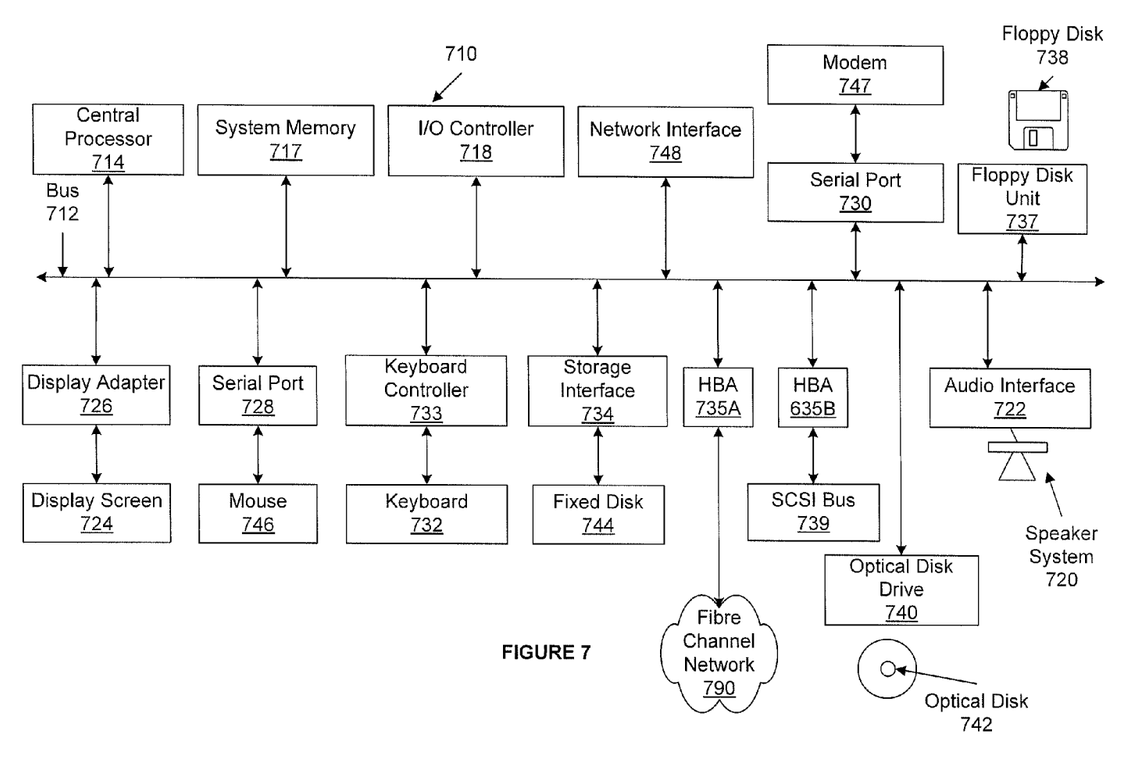
FIG. 7 illustrates an example data processing system in which an embodiment of the present invention may be implemented.

FIG. 7 depicts a block diagram of a computer system 710 suitable for implementing aspects of the present invention (e.g., clients 210, backup server 230, and deduplication server 240). Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer-readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present invention. The devices and subsystems can be interconnected in different ways from that shown in FIG. 7. The operation of a computer system such as that shown in FIG. 7 is readily known in the art and is not discussed in detail in this application. Code to implement the present invention can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
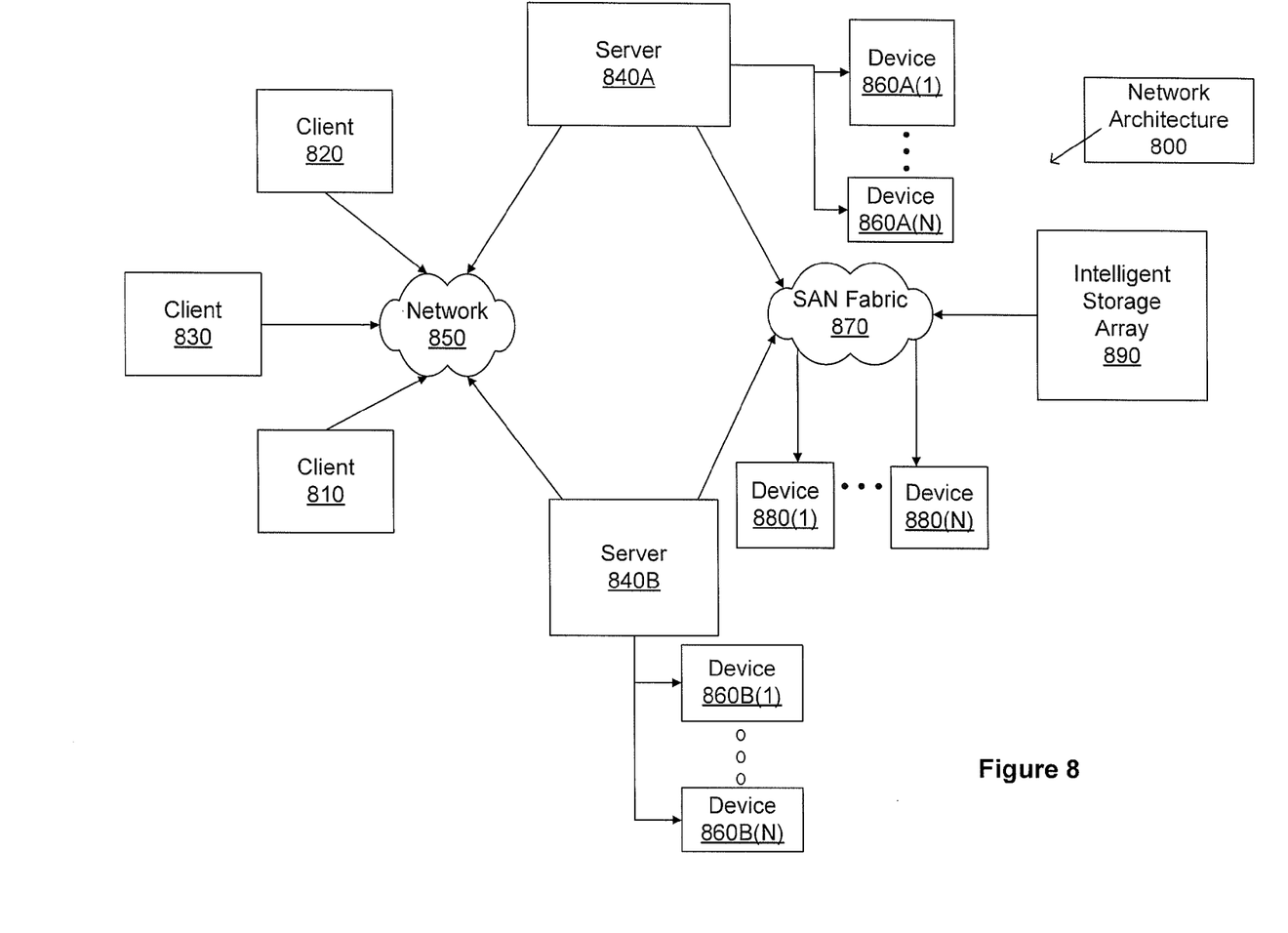
FIG. 8 depicts an example network architecture in which an embodiment of the present invention may be implemented.

FIG. 8 is a block diagram depicting a network architecture 800 in which client systems 810, 820 and 830, as well as storage servers 840A and 840B (any of which can be implemented using computer system 710), are coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation of the invention. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 710, modem 747, network interface 748 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Although the present invention has been described in connection with several embodiments, the invention is not intended to be limited to the specific forms set forth herein. On the contrary, it is intended to cover such alternatives, modifications, and equivalents as is reasonably included within the scope of the invention as defined by the appended claims.

What is claimed is:

1. A method comprising
   selecting, using one or more processors, two containers of a plurality of containers, wherein
      the plurality of containers store a plurality of data segments,
      the plurality of data segments are distributed among the plurality of containers such that each of the plurality of containers stores data segments of the plurality of data segments,
      the selecting is performed using a predetermined criterion,
      the predetermined criterion comprises
         a retention time for each of the plurality of data segments, and
      the retention time defines an amount of time the each of the plurality of data segments is to be stored in the plurality of containers before the each of the plurality of data segments is to be deleted from the plurality of containers; and
   reallocating the plurality of data segments among the plurality of containers, wherein
      the reallocating comprises
         moving at least one of the plurality of data segments from a first container of the two containers to a second container of the two containers.

2. The method of claim 1, wherein
   the predetermined criterion indicates access locality of the each of the plurality of data segments,
   the plurality of data segments are configured to be accessed in a sequence, and
   the access locality of each of the plurality of data segments comprises
      a probability that, when accessed in the sequence, the each of the plurality of data segments will be accessed together with at least another of the plurality of data segments.

3. The method of claim 1, wherein
the plurality of data segments are distributed among the plurality of containers such that a gap exists within at least one of the plurality of containers,
the gap is between a first data segment of the plurality of segments and a second data segment of the plurality of segments stored in the at least one of the plurality of containers, and
the reallocating operates to remove the gap.

4. The method of claim 1, wherein after the reallocating, the first container does not comprise any of the plurality of data segments.

5. The method of claim 1, wherein prior to the reallocating,
the first container comprises a first amount of allocated space occupied by a first subset of the plurality of data segments and a first amount of allocated space not occupied by the first subset of the plurality of data segments;
the second container comprises a second amount of allocated space not occupied by a second subset of the plurality of data segments;
the plurality of data segments comprises
the first subset and the second subset of the plurality of data segments.

6. The method of claim 5, wherein prior to the reallocating, the second amount of allocated space not occupied by the second subset of the plurality of data segments is greater than or equal to the first amount of allocated space occupied by the first subset of the plurality of data segments.

7. The method of claim 5, wherein
the moving the at least one of the plurality of data segments from the first container to the second container comprises
moving the at least one of the plurality of data segments from the first amount of allocated space occupied by the first subset to the second amount of allocated space not occupied by the second subset.

8. The method of claim 1, wherein
the plurality of data segments comprises
a first data segment, and
a second data segment,
the first and second data segments are stored in at least one of the plurality of containers,
the first data segment is received from a first data source,
the second data segment is received from a second data source,
a first metadata is associated with the first data segment,
a second metadata is associated with the second data segment,
the first metadata references the second data segment to indicate that the second data segment is dependent on the first data segment.

9. The method of claim 8, wherein
the first metadata identifies the first data source, and
the second metadata identifies the second data source.

10. The method of claim 8, further comprising:
determining whether the retention time for the first data segment is expired, and
determining whether the first metadata comprises a reference to another data segment,
wherein, in response to determining that
the retention time for the first stored segment is expired, and
the first metadata references the second data segment,
the first data segment is not deleted.

11. A non-transitory computer program product comprising:
a plurality of instructions, comprising:
a first set of instructions, executable on a computer system, configured to select two containers of a plurality of containers, wherein
the plurality of containers a plurality of data segments,
the plurality of data segments are distributed among the plurality of containers such that each of the plurality of containers stores data segments of the plurality of data segments,
the selection is performed using a predetermined criterion,
the predetermined criterion comprises
a retention time for each of the plurality of data segments, and
the retention time defines an amount of time the each of the plurality of data segments is to be stored in the plurality of containers before the each of the plurality of data segments is to be deleted from the plurality of containers; and
a second set of instructions, executable on a computer system, configured to reallocate the plurality of data segments among the plurality of containers, wherein
the reallocation comprises
moving at least one of the plurality of data segments from a first container of the two containers to a second container of the two containers; and
a computer-readable storage medium, wherein the plurality of instructions are encoded in the computer-readable storage medium.

12. The non-transitory computer program product of claim 11, wherein
the predetermined criterion indicates access locality of the each of the plurality of data segments,
the plurality of data segments are configured to be accessed in a sequence, and
the access locality of each of the plurality of data segments comprises
a probability that, when accessed in the sequence, the each of the plurality of data segments will be accessed together with at least another of the plurality of data segments.

13. The non-transitory computer program product of claim 11, wherein
the plurality of data segments are distributed among the plurality of containers such that a gap exists within at least one of the plurality of containers,
the gap is between a first data segment of the plurality of segments and a second data segment of the plurality of segments stored in the at least one of the plurality of containers, and
the reallocation operates to remove the gap.

14. The non-transitory computer program product of claim 11, wherein
after the reallocation, the first container does not comprise any of the plurality of data segments.

15. The non-transitory computer program product of claim 11, wherein
the plurality of data segments comprises
a first data segment, and
a second data segment,
the first and second data segments are stored in at least one of the plurality of containers,
the first data segment is received from a first data source,
the second data segment is received from a second data source,
a first metadata is associated with the first data segment, a second metadata is associated with the second data segment, the first metadata references the second data segment to indicate that the second data segment is dependent on the first data segment.

16. A system comprising:
one or more processors;
a storage, wherein
   the storage stores a plurality of containers,
   the plurality of containers store a plurality of data segments, and
   the plurality of data segments are distributed among the plurality of containers such that each of the plurality of containers stores data segments of the plurality of data segments; and
a compaction module executable by the one or more processors to:
   select two containers of a plurality of containers, wherein
      the compaction module performs the selection using a predetermined criterion,
      the predetermined criterion comprises
         a retention time for each of the plurality of data segments, and
      the retention time defines an amount of time the each of the plurality of data segments is to be stored in the plurality of containers before the each of the plurality of data segments is to be deleted from the plurality of containers, and
   reallocate the plurality of data segments among the plurality of containers, wherein
      the compaction module performs the reallocation by moving at least one of the plurality of data segments from a first container of the two containers to a second container of the two containers.

17. The system of claim 16, wherein
the predetermined criterion indicates access locality of the each of the plurality of data segments,
the plurality of data segments are configured to be accessed in a sequence, and
the access locality of each of the plurality of data segments comprises
   a probability that, when accessed in the sequence, the each of the plurality of data segments will be accessed together with at least another of the plurality of data segments.

18. The system of claim 16, wherein
the plurality of data segments are distributed among the plurality of containers such that a gap exists within at least one of the plurality of containers,
the gap is between a first data segment of the plurality of segments and a second data segment of the plurality of segments stored in the at least one of the plurality of containers, and
the reallocation operates to remove the gap.

19. The system of claim 16, wherein
after the compaction module performs the reallocation, the first container does not comprise any of the plurality of data segments.

20. The system of claim 16, wherein
the plurality of data segments comprises
   a first data segment, and
   a second data segment,
the first and second data segments are stored in at least one of the plurality of containers,
the first data segment is received from a first data source,
the second data segment is received from a second data source,
a first metadata is associated with the first data segment,
a second metadata is associated with the second data segment,
the first metadata references the second data segment to indicate that the second data segment is dependent on the first data segment.

* * * * *